(12) United States Patent
Mutsuda et al.

(10) Patent No.: US 12,012,532 B2
(45) Date of Patent: Jun. 18, 2024

(54) CURABLE RESIN COMPOSITION, COMPOSITE MEMBER, AND PRODUCTION METHOD THEREFOR

(71) Applicants: DAICEL-EVONIK LTD., Tokyo (JP); HONDA MOTOR CO.,LTD., Tokyo (JP)

(72) Inventors: Mitsuteru Mutsuda, Tokyo (JP); Hirofumi Iguchi, Tokyo (JP); Toshiaki Nakamura, Tokyo (JP); Nao Sato, Wako (JP); Mutsuo Tezuka, Wako (JP); Yasufumi Nakajima, Wako (JP)

(73) Assignees: DAICEL-EVONIK LTD., Tokyo (JP); HONDA MOTOR CO., LTD., Tokyo (JP)

( * ) Notice: Subject to any disclaimer, the term of this patent is extended or adjusted under 35 U.S.C. 154(b) by 531 days.

(21) Appl. No.: 17/267,682

(22) PCT Filed: Aug. 7, 2019

(86) PCT No.: PCT/JP2019/031105
§ 371 (c)(1),
(2) Date: Feb. 10, 2021

(87) PCT Pub. No.: WO2020/044995
PCT Pub. Date: Mar. 5, 2020

(65) Prior Publication Data
US 2021/0198541 A1    Jul. 1, 2021

(30) Foreign Application Priority Data

Aug. 30, 2018   (JP) .................................. 2018-161085

(51) Int. Cl.
*C09J 175/12*   (2006.01)
*B32B 7/12*   (2006.01)
(Continued)

(52) U.S. Cl.
CPC ............... *C09J 175/12* (2013.01); *B32B 7/12* (2013.01); *B32B 15/088* (2013.01); *B32B 15/18* (2013.01); *B32B 27/34* (2013.01); *C08G 18/58* (2013.01); *C08G 18/603* (2013.01); *C08G 18/80* (2013.01); *C09J 11/06* (2013.01); *B32B 2255/06* (2013.01); *B32B 2255/26* (2013.01); *B32B 2307/714* (2013.01); *B32B 2605/00* (2013.01)

(58) Field of Classification Search
CPC ... B32B 2605/08; B32B 15/08; B32B 15/095; B32B 27/28; B32B 27/32; B32B 27/38; B32B 27/40; B32B 27/285; B32B 27/286; B32B 27/288; B32B 27/302; B32B 27/306; B32B 27/325; B32B 27/36; B32B 27/42; B32B 2262/101; B32B 2262/106; B32B 2264/108; B32B 2307/208; B32B 2307/306; B32B 27/22; B32B 27/304; B32B 27/365; B32B 2262/103; B32B 2274/00; B32B 7/12; B32B 15/088; B32B 15/18; B32B 27/34; B32B 2255/06; B32B 2255/26; B32B 2307/714; B32B 2605/00; B32B 2270/00; B32B 2605/12; B32B 9/005; B32B 9/043; B32B 9/045; B32B 15/06; B32B 15/082; C09J 175/12; C09J 11/06; C09J 175/04; C09J 175/02; C08G 18/58; C08G 18/603; C08G 18/80; C08G 18/581; C08G 18/798

See application file for complete search history.

(56) References Cited

U.S. PATENT DOCUMENTS 4,495,317 A * 1/1985 Albers ................. C09D 163/00
                                                                  523/414
4,742,110 A * 5/1988 Sakashita ............. C08G 69/265
                                                                  528/340
(Continued)

FOREIGN PATENT DOCUMENTS

CN    103694756 A    4/2014
JP    60-188609 A    9/1985
(Continued)

OTHER PUBLICATIONS

International Search Report for PCT/JP2019/031105 mailed on Nov. 12, 2019.
Written Opinion of the International Searching Authority for PCT/JP2019/031105 (PCT/ISA/237) mailed on Nov. 12, 2019.
(Continued)

*Primary Examiner* — Kevin R Kruer
(74) *Attorney, Agent, or Firm* — Birch, Stewart, Kolasch & Birch, LLP

(57) ABSTRACT

Provided are a curable resin composition having high durability and adherence to a base material such as a metal, a molded composite member formed by coating the base material with the curable resin composition and performing resin molding, and a production method for the same. The curable resin composition contains a polyamide-based resin, a blocked polyisocyanate, and an epoxy compound, and the polyamide-based resin has an amino group concentration from 20 to 300 mmol/kg, and has a water absorption of 1 mass % or less determined by a water absorption test specified by ASTM D570. The polyamide-based resin has a $C_{8-18}$ alkylene chain and has a melting point from 160 to 250° C. Per 1 mol of amino groups of the polyamide-based resin, a proportion of isocyanate groups of the blocked polyisocyanate is from 1.5 to 5 mol, and a proportion of epoxy groups of the epoxy compound is from 0.1 to 0.8 mol.

15 Claims, No Drawings

(51) Int. Cl.
   *B32B 15/088*   (2006.01)
   *B32B 15/18*    (2006.01)
   *B32B 27/34*    (2006.01)
   *C08G 18/58*    (2006.01)
   *C08G 18/60*    (2006.01)
   *C08G 18/80*    (2006.01)
   *C09J 11/06*    (2006.01)

(56) References Cited

U.S. PATENT DOCUMENTS

| | | | | |
|---|---|---|---|---|
| 4,849,474 | A | * | 7/1989 | Gallucci ............... C08K 5/13 525/905 |
| 2003/0173707 | A1 | * | 9/2003 | Becker ............... C08G 69/265 264/272.17 |
| 2005/0165211 | A1 | * | 7/2005 | Nataniel ............... C08G 69/26 528/310 |
| 2008/0157439 | A1 | * | 7/2008 | Park ............... C08J 3/28 264/494 |
| 2011/0143142 | A1 | | 6/2011 | Risthaus et al. |
| 2014/0212363 | A1 | * | 7/2014 | Harman ............... A61Q 5/12 424/59 |
| 2016/0272763 | A1 | * | 9/2016 | Bhargava ............... C08G 69/28 |
| 2017/0044318 | A1 | * | 2/2017 | Im ............... C08G 69/48 |
| 2021/0198541 | A1 | * | 7/2021 | Mutsuda ............... B32B 27/281 |

FOREIGN PATENT DOCUMENTS

| | | |
|---|---|---|
| JP | 2-153976 A | 6/1990 |
| JP | 11-158436 A | 6/1999 |
| JP | 2007-190917 A | 8/2007 |

OTHER PUBLICATIONS

German Office Action for German Application No. 11 2019 004 343.9, dated Mar. 11, 2022, with English translation.
International Preliminary Report on Patentability and Written Opinion mailed Mar. 11, 2021, in PCT/JP2019/031105.

* cited by examiner

CURABLE RESIN COMPOSITION, COMPOSITE MEMBER, AND PRODUCTION METHOD THEREFOR

TECHNICAL FIELD

The present invention relates to a curable resin composition useful for imparting durability and high adherence to a base material such as a metal, and also relates to a composite member formed by coating a surface of a base material with a cured film of the curable resin composition, a molded composite member in which a resin layer is molded to the cured film, and a method for producing the same.

BACKGROUND ART

In order to improve the corrosion resistance and durability of a metal, a coating layer is formed by a method such as flow immersion or electrostatic coating. In particular, in applications where high durability is required, such as vehicular structural members of vehicles (such as automobiles), airplanes, and the like, metals are treated with a primer and hybridized by molding a resin onto the primer layer (adhesive layer), and a hybrid member is produced.

JP 2007-190917 A (Patent Document 1) and the corresponding patent publication US 2011/0,143,142 A1 describe a method of producing a hybrid member formed from a metal and a polymer, in which the metal and polymer are bonded together by a copolyamide-based hotmelt adhesive which further contains an isocyanate and an epoxide. These patent documents also indicate that the hotmelt adhesive contains: a copolyamide based on laurolactam, from 2.5 to 15% of a blocked isocyanate, and from 2.5 to 10% and an epoxide. Patent Document 1 also discloses a hotmelt adhesive containing: VESTAMELT X1038-P1 [60% laurolactam, 25% caprolactam, and 15% AH salt (mixture of 50% adipic acid and 50% hexamethylene diamine)] (at a proportion of 95%) available from Degussa GMBH; VESTAGON BF1540-P1 (at a proportion of 5%), and Araldite GT7004 (at a proportion of 5%), and indicates that a polymeric structure is formed by injection molding in the final step.

When this adhesive is electrostatically coated and heated, an adhesive layer with high adherence to metal can be formed, and a hybrid member with high durability can be produced by injection molding a thermoplastic resin onto this adhesive layer.

However, while the reason for this is not clear, when the hybrid member formed in this manner is immersed in hot water, the adherence may decrease. In addition, when the thermoplastic resin is injection-molded to the adhesive layer, voids may be formed at the interface between the metal and the adhesive layer. As a result, a high level of corrosion resistance and durability cannot be maintained over a long period of time.

CITATION LIST

Patent Document

Patent Document 1: JP 2007-190917 A (claims, paragraphs [0009] and [0010])

SUMMARY OF INVENTION

Technical Problem

Therefore, an object of the present invention is to provide a curable resin composition useful for imparting a high level of durability and adherence to a base material such as a metal, a composite member in which a surface of the base material is coated with a coating layer (adhesive layer or cured film) of the curable resin composition, a molded composite member in which a resin is molded to the adhesive layer, and a method for producing the same.

Another object of the present invention is to provide a curable resin composition useful for forming an adhesive layer (or cured film) having high adherence to a base material such as a metal and improved hot water resistance, a composite member using this resin composition (composite member primed with the curable resin composition), a molded composite member, and a method for producing the same.

Yet another object of the present invention is to provide a curable resin composition suitable for producing a molded composite member that is uniform and exhibits high durability even when a thermoplastic resin is molded at a high temperature with respect to the adhesive layer (or cured film).

Solution to Problem

The present inventors investigated the cause of a decrease in adherence that occurs when the hybrid member is immersed in hot water, and discovered that when a thermoplastic resin is molded to the adhesive layer, depending on the molding conditions, voids tend to form at the interface between the base material such as metal and the hotmelt adhesive layer, and that a terminal amino group of a polyamide-based resin of the hotmelt adhesive is strongly involved in the adherence. On the basis of these findings, the present inventors conducted further diligent research, and as a result, discovered that when a curable resin composition containing a predetermined polyamide-based resin having a terminal amino group, a blocked polyisocyanate, and an epoxy compound is used to form an adhesive layer on a base material surface, even if a thermoplastic resin is molded to this adhesive layer, the adherence to the base material is extremely high, and even when immersed in hot water, a uniform and highly durable mold member can be reliably obtained. Thus, the present inventors arrived at the present invention.

That is, a curable resin composition (or a reactive resin composition) of the present invention contains a polyamide-based resin, a blocked polyisocyanate, and an epoxy compound, and the polyamide-based resin contains an amino group (for example, a terminal amino group) and has low water absorbency. Namely, the water absorption of the polyamide-based resin is 1 mass % or less (for example, 0.75 mass % or less, preferably 0.65 mass % or less, and even more preferably 0.3 mass % or less) determined by a water absorption test specified by ASTM D570.

The polyamide-based resin contains a $C_{8-18}$ alkylene chain (for example, a $C_{9-16}$ alkylene chain), and the approximate amino group concentration of the polyamide-based resin is from 5 to 300 mmol/kg (for example, from 20 to 300 mmol/kg, preferably from 50 to 250 mmol/kg, and even more preferably from 100 to 200 mmol/kg). The melting point of the polyamide-based resin may be about from 160 to 250° C. (for example, from 160 to 230° C., and preferably from 170 to 220° C.).

The polyamide-based resin may contain a component having a $C_{8-16}$ alkylene chain (for example, a component having a $C_{10-14}$ alkylene chain) at a proportion from 65 to 100 mol % (for example, from 70 to 100 mol %) relative to a total amount of the components (monomers) forming the polyamide-based resin. Specifically, the polyamide-based resin may be a homo- or copolyamide resin that contains a component having at least one type of $C_{11-13}$ alkylene chain selected from the group consisting of $C_{11-13}$ lactams and $C_{11-13}$ aminocarboxylic acids, at a proportion from 75 to 100 mol % (for example, from 80 to 100 mol %) relative to the total amount of components (monomers) forming the polyamide-based resin.

The blocked polyisocyanate may have a glass transition temperature from 60 to 110° C., a melting point from 70 to 130° C., and a dissociation temperature from 120 to 200° C. Furthermore, the epoxy compound may include a bisphenol-type epoxy resin having a softening temperature of 75° C. or higher.

The quantitative proportion of each component can be selected in accordance with the concentration, reactivity, and the like of the functional groups (reactive groups) of each component, and the proportion of isocyanate groups (blocked isocyanate groups) of the blocked polyisocyanate may be an excessive amount per 1 mol of amino groups of the polyamide-based resin, and may be approximately, for example, from 1.5 to 5 mol (for example, from 2 to 4 mol).

Furthermore, the proportion of epoxy groups of the epoxy compound may be approximately, for example, from 0.1 to 0.8 mol (for example, from 0.2 to 0.7 mol) per 1 mol of the amino group concentration of the polyamide-based resin.

In the resin composition, relative to the concentration (mmol/kg) of amino groups ($NH_2$) of the polyamide-based resin, the concentration (mmol/kg) of the isocyanate groups (NCO) of the blocked polyisocyanate may be an excessive amount (mmol/kg), and may be for example, an excess of approximately from 15 to 450 mmol/kg (for example, from 30 to 300 mmol/kg). The total number of moles of isocyanate groups of the blocked polyisocyanate may be from 1.3 to 50 times (for example, from 1.5 to 40 times) the total number of moles of the amino groups of the polyamide-based resin. Furthermore, in the resin composition, the concentration of epoxy groups may be approximately, for example, from 3 to 35 mol % (for example, from 5 to 25 mol %) relative to the total amount (total number of moles) of the amino groups, isocyanate groups, and epoxy groups.

The ratio (molar ratio) of the isocyanate groups of the blocked polyisocyanate to hydroxyl groups (secondary hydroxyl groups) of the epoxy compound may be approximately, for example, (isocyanate groups)/(hydroxyl groups) =from 0.6/1 to 1.4/1.

The quantitative proportion of the polyamide-based resin may be approximately 65 to 90 mass % per 100 mass % of the total amount of the polyamide-based resin, the blocked polyisocyanate, and the epoxy compound. Per 100 parts by mass of the polyamide-based resin, the proportion of the blocked polyisocyanate may be approximately 5 to 30 parts by mass and the proportion of the epoxy compound may be approximately 5 to 30 parts by mass.

The present invention also includes a composite member (composite) including an adhesive layer formed from a curable resin composition (such as a powdered composition), and a method for producing the same. In this composite member, an adhesive layer (for example, a reactive adhesive layer) formed from the curable resin composition is formed on a surface of a base material (such as a metal base material). The composite member can be produced by coating (for example, powder coating such as electrostatic powder coating or flow immersion coating) a surface of a base material with the curable resin composition (for example, a powdered curable resin composition) to form an adhesive layer.

Furthermore, the present invention also encompasses a molded composite member (insert molded member or laminate) produced by molding or laminating a composition containing at least a thermoplastic resin onto the adhesive layer, and a method for producing the same. The thermoplastic resin may include a polyamide-based resin having a higher melting point than that of the polyamide-based resin of the curable resin composition.

The molded composite member can be produced by forming the adhesive layer, and then molding (for example, injection molding) or laminating a composition containing at least a thermoplastic resin onto the adhesive layer.

Note that in the present specification, epoxy compounds including also the epoxy resin may be simply referred to as an "epoxy compound", and the protected isocyanate group of the blocked polyisocyanate may be referred to simply as an "isocyanate group". In addition, epoxy groups including also a glycidyl group may simply be referred to as "epoxy groups".

Advantageous Effects of Invention

In the present invention, because a predetermined curable resin composition (adhesive resin composition) is used, a composite member coated with an adhesive layer (or cured film) having high adherence and durability with respect to a base material such as metal can be produced, and a molded composite member can be produced by molding or laminating a thermoplastic resin onto the adhesive layer. Furthermore, the composite member, which is subjected to a primer treatment with a curable resin composition to thereby form the adhesive layer (or the reactive adhesive layer), exhibits a high level of adherence to a base material such as metal, and hot water resistance can be significantly improved. Therefore, even when a thermoplastic resin is molded or laminated at a high temperature with respect to the adhesive layer (or the cured film), a uniform and highly durable molded composite member can be produced without creating voids at the interface between the adhesive layer and the base material such as metal.

DESCRIPTION OF EMBODIMENTS

Polyamide-based resins include polyamide resins (including homo- or copolyamide resins) and polyamide elastomers (polyamide block copolymers), and can be formed from amide-forming components of any of (a) to (c) below.
  (a) A first amide-forming component made by combining an alkylene diamine component and an alkane dicarboxylic acid component;
  (b) a second amide-forming component made from at least one of a lactam component or an aminocarboxylic acid component; and
  (c) a first amide-forming component and a second amide-forming component.

That is, the polyamide-based resin can be formed from any of the amide-forming components (a) to (c) (the first amide-forming component; the second amide-forming component; a combination of the first amide-forming component and the second amide-forming component), and the polyamide elastomer can be prepared using a polyamide formed from the amide-forming component of any of (a) to (c). Note that a lactam component and an aminocarboxylic acid component having the same number of carbons and branched chain structure can be regarded as being mutually equivalent components.

The polyamide resin may be an alicyclic polyamide, but is usually an aliphatic polyamide in many cases. The polyamide resin may be a homopolyamide resin or a copolyamide resin (a copolymerized polyamide resin). Note that the copolyamide resin may be, for example, a copolyamide resin formed from first amide-forming components having a different number of carbons; a copolyamide resin of the first amide-forming component and a second amide-forming component; a copolyamide resin formed from second amide-forming components having a different number of carbons, or the like. Note that a copolyamide resin formed from a first amide-forming component and/or a second amide-forming component having a different number of carbons is referred to as a first copolyamide resin, and a copolyamide resin formed from the first amide-forming component and/or the second amide-forming component and a copolymerizing component (alicyclic or aromatic component) may be referred to as a second copolyamide resin.

Examples of the alkylene diamine component include $C_{8-18}$ alkylene diamines such as octamethylene diamine, decanediamine, dodecanediamine, tetradecanediamine, and octadecanediamine. These diamine components can be used alone or in a combination of two or more types. Preferable diamine components include at least $C_{8-18}$ alkylene diamines (preferably $C_{10-16}$ alkylene diamines, preferably $C_{11-16}$ alkylene diamines, and particularly $C_{11-14}$ alkylene diamines such as dodecane diamine).

Examples of the alkane dicarboxylic acid component include $C_{8-36}$ alkane dicarboxylic acids such as suberic acid, azelaic acid, sebacic acid, dodecanedioic acid, and octadecanedioic acid. These dicarboxylic acid components can be used alone or in a combination of two or more types. Preferred dicarboxylic acid components include $C_{8-18}$ alkane dicarboxylic acids (for example, $C_{10-16}$ alkane dicarboxylic acid, and preferably $C_{12-14}$ alkane dicarboxylic acid).

In the first amide-forming component, the diamine component can be used in an approximate range from 0.8 to 1.2 mol, and preferably from 0.9 to 1.1 mol, per 1 mol of the dicarboxylic acid component.

Examples of the lactam component include $C_{8-20}$ lactams such as ω-octanelactam, ω-nonanelactam, ω-decanelactam, ω-undecanelactam, ω-laurolactam (or ω-laurinlactam or dodecanelactam), and ω-tridecanelactam. Examples of the aminocarboxylic acid component include $C_{8-20}$ aminocarboxylic acids such as ω-aminodecanoic acid, ω-aminoundecanoic acid, ω-aminododecanoic acid, and ω-aminotridecanoic acid. These lactam components and aminocarboxylic acid components can be used alone or in a combination of two or more types.

Preferable lactam components include, for example, $C_{8-18}$ lactams, preferably $C_{10-16}$ lactams (for example, $C_{10-15}$ lactams), and more preferably $C_{10-14}$ lactams (for example, $C_{11-13}$ lactams); and preferable aminocarboxylic acids have the same number of carbons as the above preferable lactam components. In particular, the lactam component and/or aminocarboxylic acid often includes at least a $C_{11-12}$ lactam component and/or an aminocarboxylic acid (such as undecanelactam, laurolactam (or laurinlactam), aminoundecanoic acid, or aminododecanoic acid), and is, for example, a Cu lactam component and/or a Cu aminocarboxylic acid.

The ratio (molar ratio) of the first amide-forming component to the second amide-forming component can be selected from a range of the (first amide-forming component)/(second amide-forming component)=100/0 to 0/100, and may be approximately, for example, from 90/10 to 0/100 (for example, from 80/20 to 5/95), preferably from 75/25 to 10/90 (for example, from 70/30 to 15/85), and more preferably from 60/40 to 20/80.

Preferred polyamide resins include, as the first and/or second amide-forming components, components having at least a $C_{8-18}$ alkylene chain (or a linear alkylene chain), such as, for example, $C_{8-16}$ alkylene chains (for example, $C_{9-15}$ alkylene chains); preferably a $C_{10-14}$ alkylene chain (for example, $C_{11-14}$ alkylene chains), and more preferably a $C_{11-13}$ alkylene chain (for example, $C_{11-12}$ alkylene chains).

The polyamide resin formed from such a component exhibits high hot water resistance and heat resistance, excels in adherence to a base material such as a metal, and is useful for forming a uniform and strong adhesive layer (primer layer or reactive adhesive layer) on the surface of the base material.

Note that, the polyamide resin that uses, as the first and/or second amide-forming component, a component having a $C_{8-18}$ alkylene chain may be a homopolyamide resin (a homopolyamide resin of a component having an alkylene chain with a specific number of carbons), or a first copolyamide resin (a copolymer of a plurality of components with different numbers of carbons from among the $C_{8-18}$ alkylene chains; a first copolyamide resin between a component having the $C_{8-18}$ alkylene chain (or linear alkylene chain), and a short chain first and/or second amide-forming component).

Examples of the short-chain first amide-forming component include alkylene diamines with a main chain carbon count of $C_{4-7}$ such as tetramethylene diamine, hexamethylene diamine, and trimethylhexamethylene diamine; and $C_{6-7}$ alkane dicarboxylic acids such as adipic acid and pimelic acid; and examples of the short-chain second amide-forming component include $C_{4-7}$ lactams such as δ-valerolactam, ε-caprolactam, and ω-heptalactam, and $C_{4-7}$ aminocarboxylic acids. The usage amount of short-chain first and second amide-forming components is small in relation to the total of the first and second amide-forming components, and for example, may be approximately from 0 to 50 mol %, preferably from 0 to 40 mol %, and more preferably from 0 to 30 mol %.

Furthermore, as necessary, the copolyamide resin may be a copolymer (second copolyamide resin) formed with a copolymerizing component that is copolymerizable with the first and/or second amide-forming component, and as the copolymerizing component, a diamine component may be an alicyclic diamine component (such as a diamino $C_{5-10}$ cycloalkane such as a diaminocyclohexane; a bis(amino $C_{5-8}$ cycloalkyl) $C_{1-3}$ alkane such as bis(4-aminocyclohexyl) methane, bis(4-amino-3-methylcyclohexyl) methane, and 2,2-bis(4-aminocyclohexyl) propane; and hydrogenated xylylene diamine), or an aromatic diamine component (such as metaxylylene diamine). In addition, examples of the dicarboxlyic acid component as the copolymerizing component include alicyclic dicarboxylic acid components (such as $C_{5-10}$ cycloalkane dicarboxylic acids such as cyclohexane-1,4-dicarboxylic acid and cyclohexane-1,3-dicarboxylic acid), and aromatic dicarboxlyic acids (such as terephthalic acid and isophthalic acid). Note that an alicyclic polyamide resin (transparent polyamide) may be formed using, as the component copolymerizing with the first and/or second amide-forming component, an alicyclic diamine component and/or an alicyclic dicarboxylic acid component.

In the polyamide resin, the proportion of the first and second amide-forming components may be approximately, with respect to the overall components, from 60 to 100 mol % (for example, from 70 to 100 mol %), preferably from 80 to 100 mol % (for example, from 85 to 97 mol %), and more preferably from 90 to 100 mol %. In particular, preferred polyamide resins include a homopolyamide resin or a copolyamide resin having, with respect to a total amount of components (monomers) (or first and second amide-forming components) that form the polyamide-based resin, a proportion of a component having a $C_{8-16}$ alkylene chain (preferably a $C_{10-14}$ alkylene chain, and more preferably a $C_{11-13}$ alkylene chain) of approximately from 65 to 100 mol % (for example, from 65 to 98 mol %), preferably from 70 to 100 mol % (for example, from 75 to 98 mol %), more preferably from 80 to 100 mol % (for example, from 85 to 100 mol %), and particularly from 90 to 100 mol % (for example, from 95 to 100 mol %). Particularly preferred polyamide resins include homo- or copolyamide resins in which at least one component selected from, for example, $C_{11-13}$ lactams and/or $C_{11-13}$ aminocarboxylic acids (for example, laurolactam, aminoundecanoic acid, and aminododecanoic acid) is used as an amide-forming component.

Note that the polyamide resin may be a modified polyamide such as a polyamide having a branched chain structure introduced using a small amount of a polycarboxylic acid component and/or a polyamine component.

Examples of such a polyamide resin include homopolyamide resins (polyamide 8, polyamide 9, polyamide 10, polyamide 11, polyamide 12, polyamide 13, polyamide 610, polyamide 611, polyamide 612, polyamide 911, polyamide 912, polyamide 1010, and polyamide 1012, etc.), and copolyamides (polyamide 6/10, polyamide 6/11, polyamide 6/12, polyamide 10/10, polyamide 10/12, polyamide 11/12, polyamide 12/13, polyamide 12/18, and polyamide 14/18, etc.). These polyamide resins can be used alone or in a combination of two or more types. Note that in the polyamide resins, the components separated by the forward slash "/" indicate the first or second amide-forming components. In particular, polyamide resins with a long alkylene chain such as, for example, polyamide 610, polyamide 612, polyamide 1010, polyamide 1012, polyamide 10, polyamide 11, polyamide 12, polyamide 6/10, polyamide 6/11, and polyamide 6/12, and of these, particularly polyamide 11 and polyamide 12 (for example, a homopolymer of lauryl lactam), are often used.

Examples of polyamide elastomers (polyamide block copolymers) include polyamide block copolymers formed by a polyamide segment as a hard segment (or a hard block) (a polyamide segment corresponding to the polyamide resins, for example polyamide 11 or polyamide 12) and a soft segment (or soft block). The soft segment can be formed, for example, of a polyether, a polyester, a polycarbonate, or the like. Typical polyamide elastomers are polyamide-polyether block copolymers such as, for example, polyether amides [such as, for example, block copolymers of a dicarboxylic terminated polyamide block and a diol terminated poly $C_{2-6}$ alkylene glycol block (or polyoxyalkylene block)]. Note that the polyamide elastomer may have an ester bond.

In the polyamide elastomer, the number average molecular weight (calibrated with polystyrene) of the soft segment as measured by gel permeation chromatography (GPC) can be selected from a range of approximately from 100 to 10000 for example, and may be approximately from 300 to 5000 (for example, from 500 to 5000), and preferably from 1000 to 2000. The ratio (mass ratio) of the polyamide block (polyamide segment) to the soft segment (or block), (polyamide block)/(soft segment), may be approximately, for example, from 75/25 to 10/90, and preferably from 70/30 to 15/85.

These polyamide-based resins may be used alone or in a combination of two or more types. Of these polyamide-based resins, the polyamide resin described above is preferable.

The polyamide-based resin preferably exhibits low water absorbency or hygroscopicity. That is, the water absorption of the polyamide-based resin is 1 mass % or less (for example, from 0.01 to 0.8 mass %), preferably 0.75 mass % or less (for example, from 0.05 to 0.65 mass %), more preferably 0.65 mass % or less (for example, from 0.1 to 0.55 mass %), and particularly 0.5 mass % or less (for example, from 0.1 to 0.4 mass %), and may be from 0.1 to 0.65 mass %, preferably from 0.12 to 0.55 mass %, more preferably from 0.15 to 0.45 mass %, and particularly 0.3 mass % or less (for example, from 0.15 to 0.25 mass %). Note that the water absorption can be determined in accordance with the water absorption test specified by ASTM D570, in which a dried sample is cooled in a desiccator, then the mass of the sample is measured, the sample is immersed in 23° C. water for 24 hours, and then removed from the water, a cloth is pressed onto the sample and excess moisture is wiped off, and the mass is measured and the change in mass (increase rate) of the test piece is calculated. Note that a sample with a thickness of 0.125 inches (approximately 0.32 cm) can be used.

Furthermore, when measured in accordance with ISO 62 at a relative humidity of 50% RH and a room temperature of 23° C., the equilibrium moisture content may be, for example, 2 mass % or less (for example, from 0.1 to 1.8 mass %), preferably 1.5 mass % or less (for example, from 0.3 to 1.5 mass %), more preferably 1.3 mass % or less (for example, from 0.4 to 1.3 mass %), and in particular, approximately 1 mass % or less (for example, from 0.5 to 0.9 mass %), or may be approximately from 0.5 to 0.85 mass % (for example, from 0.6 to 0.8 mass %).

Furthermore, when measured in accordance with method A of ISO 62 after immersion in 23° C. water for one week, the saturated moisture content rate may be approximately 5 mass % or less (for example, from 0.5 to 4.5 mass %), preferably from 0.5 to 4 mass % (for example, from 0.6 to 3.8 mass %), more preferably from 0.8 to 3.5 mass % (for example, from 1 to 3 mass %), and particularly preferably from 1.1 to 2.8 mass % (for example, from 1.2 to 2.7 mass %).

Furthermore, the average concentration of amide bonds per repeating unit in the polyamide-based resin is preferably small, and the average concentration of the amide bonds may be approximately, for example, from 1 to 10 mol/kg (for example, from 2 to 9 mol/kg), preferably from 3 to 8 mol/kg (for example, from 4 to 7 mol/kg), and even more preferably from 5 to 7 mol/kg.

The polyamide-based resin may be amorphous, but ordinarily the polyamide-based resin has crystallinity. The crystallinity of the polyamide-based resin may be approximately, for example, from 1 to 50% (for example, from 1 to 30%), preferably from 5 to 25%, and even more preferably from 10 to 20%. Note that the crystallinity can be determined by a commonly used method such as, for example, a measurement method based on density and heat of fusion, an X-ray diffraction method, or an infrared absorption method.

The polyamide-based resin has an amino group (in particular, a terminal amino group) in order to increase the adherence of the adhesive layer to a base material such as a metal. The amino group concentration $C_{NH2}$ (unit: mmol/kg) of the polyamide-based resin can be selected from an approximate range from 5 to 300 (for example, from 25 to 275), and may be approximately, for example, from 50 to 250 (for example, from 75 to 225), and preferably from 100 to 200 (for example, from 120 to 180), and ordinarily may be approximately from 50 to 200 (for example, from 50 to 180), preferably from 75 to 190 (for example, from 80 to 175), more preferably from 100 to 170 (for example, from 100 to 150), an in particular, from 125 to 160. When the amino group concentration of the polyamide-based resin is high, the adherence of the adhesive layer formed by the curable resin composition can be greatly improved.

The concentration (unit: mmol/kg) of the carboxyl group (terminal carboxyl group) of the polyamide-based resin is not particularly limited, and may be approximately, for example, 50 or less (for example, from 0 to 25), normally 20 or less (for example, from 1 to 15), preferably 10 or less (for example, from 1.5 to 7), and even more preferably from 2 to 5.

In the polyamide-based resin, the proportion of the amino groups to the carboxyl groups is not particularly limited, but the concentration of the amino groups is preferably higher than the concentration of the carboxyl groups. The ratio (molar ratio) of the amino groups to the carboxyl groups of the polyamide-based resin may be approximately, for example, from 60/40 to 100/0 (for example, from 70/30 to 99.9/0.1), preferably from 80/20 to 100/0 (for example, from 85/15 to 99.5/0.5), and more preferably from 90/10 to 99/1 (for example, from 95/5 to 98/2).

Note that the amino group concentration and the carboxyl group concentration can be measured by a commonly used method such as a titration method, for example. For example, the amino group concentration can be measured by dissolving a polyamide resin (sample) in a mixed solvent having a volume ratio of 10:1 of phenol and ethanol to prepare a 1 mass % solution, and then performing neutralization titration with a 1/100 N HCl aqueous solution. Also, the carboxyl group concentration can be measured by dissolving a polyamide resin (sample) in benzyl alcohol to prepare a 1 mass % benzyl alcohol solution, and then performing neutralization titration with a 1/100 N KOH aqueous solution.

The polyamide-based resin is solid at room temperature, and the melting point of the polyamide-based resin may be approximately, for example, from 150 to 260° C. (for example, from 160 to 250° C.), preferably from 165 to 230° C. (for example, from 170 to 220° C.), or may be approximately, for example, from 175 to 210° C. (for example, from 175 to 200° C.), and preferably from 175 to 190° C. (for example, from 175 to 185° C.). Note that the melting point of the crystalline polyamide-based resin can be measured using a differential scanning calorimeter (DSC). Note that the melting point of the polyamide-based resin refers to, when a plurality of peaks appear in the DSC, a temperature corresponding to a peak located at the highest temperature among the plurality of peaks.

The number average molecular weight (unit: $\times 10^4$) of the poly amide-based resin can be selected from an approximate range from 0.5 to 20 (for example, from 0.7 to 15), and may be approximately, for example, from 0.8 to 10 (for example, from 0.9 to 8), and preferably from 1 to 7 (for example, from 1 to 5). The molecular weight of the polyamide-based resin can be measured by gel permeation chromatography using hexafluoroisopropanol (HFIP) as a solvent and calibrated with polymethyl methacrylate.

The melt flow rate (MFR, unit: g/10 min) of the polyamide-based resin at a temperature of 230° C. and a load of 2.16 kg may be approximately from 1 to 100 (for example, from 2 to 80), preferably from 5 to 75 (for example, from 7 to 60), and even more preferably from 10 to 50 (for example, from 12 to 35). The MFR can be measured according to ISO 1133 using a melt flow rate measuring instrument.

A second polyamide resin (such as, for example, a homo- or copolyamide resin using a component having an alkylene chain with a small number of carbons, in particular, a homo- or copolyamide resin having a water absorption greater than 1 mass % and/or a copolyamide resin having a melting point less than 150° C.) may be added to a polyamide-based resin (first polyamide resin) having a water absorption of 1 mass % or less within a range that does not impair properties such as adherence. The first polyamide-based resin having a water absorption of 1 mass % or less may be used at a proportion of not less than 65 mass %, preferably not less than 70 mass %, and even more preferably not less than 75 mass % of the entire polyamide-based resin, depending on matters such as the water absorption of the first and/or second polyamide resin.

As necessary, the polyamide-based resin may contain various additives such as, for example, stabilizers (heat resistant stabilizers, weather resistant stabilizers, antioxidants, and UV absorbers, etc.), colorants, fillers, plasticizers, lubricants, flame retardants, antistatic agents, and silane coupling agents. These additives can be used alone or in a combination of two or more types. The polyamide-based resin and resin composition thereof are often typically in a powdered form.

[Blocked Polyisocyanate]

The polyisocyanate of the blocked polyisocyanate may be any of an aromatic polyisocyanate, an alicyclic polyisocyanate, an aliphatic polyisocyanate, or a heterocyclic polyisocyanate. Examples of aromatic polyisocyanates include diisocyanates such as tolylene diisocyanate (TDI), xylylene diisocyanate (XDI), tetramethylxylylene diisocyanate (TMXDI), naphthalene diisocyanate (NDI), bis(isocyanatophenyl)methane (MDI), 1,3-bis(isocyanatophenyl)propane, bis(isocyanatophenyl)ether, bis(isocyanatophenyl)sulfone, and tolidine diisocyanate (TODI). Examples of alicyclic polyisocyanates include diisocyanates such as cyclohexane 1,4-diisocyanate, isophorone diisocyanate (IPDI), hydrogenated xylylene diisocyanate, and hydrogenated bis(isocyanatophenyl)methane; and triisocyanates such as bicycloheptane triisocyanate. Examples of the aliphatic polyisocyanate include $C_{2-12}$ alkane diisocyanates such as propylene diisocyanate, trimethylene diisocyanate, tetramethylene diisocyanate, hexamethylene diisocyanate (HDI), trimethylhexamethylene diisocyanate (TMDI), and lysine diisocyanate (LDI); and alkane triisocyanates such as 1,3,6-hexamethylene triisocyanate, and 1,6,11-undecane triisocyanate methyloctane.

These polyisocyanates may be derivatives thereof, for example, multimers such as dimers, trimers (polyisocyanates having an isocyanurate ring), and tetramers; adducts; modified products such as biuret-modified products, allophonate-modified products, or urea-modified products; or urethane oligomers. Specifically, examples of derivatives of polyisocyanates include adducts of a polyisocyanate (such as hexamethylene diisocyanate or other such alkane polyisocyanate) and a polyhydric alcohol (such as trimethylolpropane or pentaerythritol), biurets of the polyisocyanate, isocyanurates having an isocyanurate ring (isocyanurate skeleton) (for example, polyisocyanates having an isocyanurate ring that is a trimer of hexamethylene diisocyanate), and polyisocyanates having a uretdione skeleton.

Of these polyisocyanates, aliphatic polyisocyanates, aromatic polyisocyanates (such as TDI and MDI) or derivatives thereof (for example, HDI or trimers thereof), and the like are often used.

Examples of blocking agents (protectants) of the blocked polyisocyanates include alcohols such as isopropanol and 2-ethylhexanol; phenols such as phenol, cresol, xylenol, and resorcin; oximes such as acetoxime, methylethylketoxime, and cyclohexane oxime; lactams such as ε-caprolactam; and active methylene compounds such as ethyl acetoacetate. These blocking agents can be used alone or in a combination of two or more. These blocking agents can be selected according to the type, the dissociation temperature, and the like, of polyisocyanate, and phenols, oximes, ε-caprolactams, active methylene compounds, and the like are often used.

A content proportion of isocyanate groups (blocked isocyanate groups) of the blocked polyisocyanate may be approximately, for example, from 5 to 30 mass % (for example, from 7.5 to 25 mass %), and preferably from 10 to 20 mass %. (for example, from 12.5 to 17.5 mass %), and may be approximately from 13 to 20 mass % (for example, from 14 to 18 mass %, and preferably from 15 to 17 mass %).

An isocyanate equivalent (units: g/eq.) of the blocked polyisocyanate may be approximately, for example, from 150 to 350, preferably from 175 to 300, and more preferably from 200 to 280 (for example, from 230 to 275).

In the blocked polyisocyanate, a concentration $C_{NCO}$ (mmol/kg) of the isocyanate groups (blocked isocyanate groups) may be approximately, for example, from 500 to 5500 (for example, from 750 to 5250), preferably from 1000 to 5000 (for example, from 1500 to 4500), and more preferably from 2000 to 4500 (for example, from 2500 to 4000), and may be approximately from 3000 to 4000.

The blocked polyisocyanate is usually a solid at room temperature, and a glass transition temperature of the blocked polyisocyanate may be approximately, for example, from 50 to 120° C., preferably from 60 to 110° C. (for example, from 65 to 95° C.), and more preferably from 70 to 100° C. (for example, from 75 to 85° C.), and typically may be approximately from 65 to 100° C. (for example, from 70 to 90° C.).

A melting point of the blocked polyisocyanate may be approximately, for example, from 70 to 130° C., preferably from 80 to 120° C., and even more preferably from 90 to 115° C., or may be approximately from 80 to 125° C. (for example, from 95 to 115° C.).

A dissociation temperature of the blocked polyisocyanate (the temperature at which the blocking agent is eliminated and the isocyanate group is regenerated) may be approximately, for example, from 100 to 220° C. (for example, from 120 to 200° C.), preferably from 130 to 190° C. (for example, from 140 to 180° C.), and even more preferably approximately from 150 to 170° C. (for example, from 155 to 165° C.). If the dissociation temperature is too low, the storage stability of the curable resin composition tends to decline, and if the dissociation temperature is too high, the coating film forming temperature or baking temperature will increase, workability will decline, and the adhesiveness of the adhesive layer may decline.

In order to adjust the dissociation temperature, a dissociation catalyst, for example, a tin compound such as dibutyltin laurate, a tertiary amine such as N-methylmorpholine, or a metal organic acid salt such as an alkali metal acetate salt, or an alkaline earth metal acetate may be added.

Blocked polyisocyanates are often typically in a powdered form.

[Epoxy Compound]

Examples of the epoxy compound (or epoxy resin) include glycidyl ether compounds, glycidyl ester compounds, glycidyl amine compounds, heterocyclic epoxy compounds, and alicyclic epoxy compounds, and the epoxy compound (or epoxy resin) has a plurality of glycidyl groups or oxirane rings. Examples of the glycidyl ether compound (glycidyl ether-type epoxy resin) include bisphenol-type epoxy resins (epoxy resins based on bisphenols such as bisphenol A, bisphenol F, bisphenol AD, bisphenol S, and bisphenol fluorene), napthol-type epoxy resins, biphenyl-type epoxy resins, triphenol-type methane epoxy resins, novolac-type epoxy resins (such as phenol novolac-type epoxy resins and cresol novolac-type epoxy resins), and modified novolac-type epoxy resins.

Examples of the glycidyl ester compounds (glycidyl ester-type epoxy resins) include glycidyl esters of polycarboxylic acids such as diglycidyl phthalate, tetrahydrophthalic acid, and hexahydrophthalic acid.

Examples of the glycidyl amine compounds (glycidyl amine-type epoxy resins) include tetraglycidyl amino diphenylmethane and triglycidyl aminophenol.

Examples of the heterocyclic epoxy compound (heterocyclic epoxy resin) include triglycidyl isocyanurate (triazine-type epoxy resin) and hydantoin-type epoxy resins. Examples of the alicyclic epoxy compound (alicyclic epoxy resin) include epoxy resins with an epoxidized cyclohexene ring.

These epoxy compounds can be used alone or in a combination of two or more. Preferred epoxy compounds are epoxy resins having a high softening point or melting point, and examples include glycidyl ether-type epoxy resins, glycidyl amine-type epoxy resins, and alicyclic epoxy resins, and particularly glycidyl ether-type epoxy resins (bisphenol-type epoxy resins) based on bisphenols such as bisphenol A. Furthermore, the epoxy compound may be a monomer, but preferably includes a multimer such as a dimer, a trimer, a tetramer, a pentamer, or a dodecamer (for example, a trimer or higher multimer). Such multimers often have hydroxyl groups in association with multimerization. The proportion of the multimers may be approximately from 45 to 99.9%, preferably from 50 to 99%, and more preferably from 55 to 98%, in terms of an area ratio determined by gel permeation chromatography.

The epoxy equivalent (units: g/eq.) of the epoxy compound can be selected from an approximate range from 250 to 5000, and may be approximately, for example, from 300 to 3000 (for example, from 400 to 2500), preferably from 500 to 2000 (for example, from 600 to 1700), and more preferably from 650 to 1000 (for example, from 700 to 800), and may be approximately from 450 to 1500 (for example, from 500 to 1200), preferably from 550 to 1000 (for example, from 600 to 900), and more preferably from 650 to 800 (for example, from 700 to 770).

The concentration $C_{EP}$ (mmol/kg) of an epoxy group in the epoxy compound may be approximately, for example, from 100 to 1000 (for example, from 150 to 900), preferably from 200 to 800 (for example, from 250 to 750), and more preferably from 300 to 700 (for example, from 350 to 650), or may be approximately from 400 to 600 (for example, from 450 to 570).

Also, the hydroxyl group concentration (mmol/kg) of the epoxy compound (or epoxy resin) is approximately, for example, from 500 to 5500 (for example, from 750 to 5250), preferably from 1000 to 5000 (from 1500 to 4500), and more preferably, from 2000 to 4500 (for example, from 2500 to 4000), or may be approximately from 3000 to 4000 (for example, from 3300 to 3800).

The softening point or melting point of the epoxy compound may be, for example, 75° C. or higher (for example, from 75 to 125° C.), preferably 80° C. or higher (for example, from 80 to 115° C.), and more preferably 85° C. or higher (for example, from 90 to 110° C.), or may be approximately from 95 to 105° C.

An epoxy compound is usually a solid at room temperature and is often in powdered form.

The epoxy compound improves adherence to a base material such as a metal, and has reactivity with an amino group of the polyamide-based resin, and therefore the adherence to the base material such as a metal is greatly improved. In addition, the epoxy compound of multimers (including dimers, trimers, or the like) may have a hydroxyl group (secondary hydroxyl group), and this hydroxyl group is involved in adherence with a base material such as a metal, exhibits reactivity with a blocked polyisocyanate, and further improves adherence to the base material.

[Proportion of Each Component]

In the present invention, the amino group (and also the carboxyl group) of the polyamide-based resin, the isocyanate group of the blocked polyisocyanate, and the epoxy group (as well as the hydroxyl group) of the epoxy compound react in a complex manner, and seem to adhere tightly with high adhesive force to the base material such as a metal. For example, typically, the isocyanate group of the blocked polyisocyanate reacts with the amino group of the polyamide-based resin (as well as the hydroxyl group of the epoxy compound), and the epoxy group of the epoxy compound reacts with the amino group (and the carboxyl group) of the polyamide-based resin, and an adhesive layer (cured film or primer layer) is formed on the base material. Therefore, the proportion of each component and the proportion of the reactive groups of each component also become complex.

The quantitative proportion of the polyamide-based resin can be selected according to the concentration of reactive groups of each component, and may be for example, relative to the total amount of 100 mass % of the polyamide-based resin, the blocked polyisocyanate, and the epoxy compound, from 50 to 95 mass % (for example, from 60 to 90 mass %), but ordinarily may be approximately from 65 to 90 mass % (for example, from 65 to 85 mass %), preferably from 67 to 83 mass % (for example, from 70 to 80 mass %), or may be approximately from 70 to 90 mass % (for example, from 75 to 85 mass %). If the proportion of the polyamide-based resin is too small or too large, the adherence to the base material tends to be reduced.

The blocked polyisocyanate reacts with the amino groups of the polyamide-based resin to greatly improve the mechanical strength and thermal properties of the adhesive layer, and seems to improve adherence to the base material. Therefore, the quantitative ratio between the polyamide-based resin and the blocked polyisocyanate can be selected according to the concentration, reactivity, and the like of the functional group (reactive group) of each component. The proportion of the isocyanate groups (blocked isocyanate groups) of the blocked polyisocyanate per 1 mol of an amino group concentration of the polyamide-based resin may be approximately, for example, from 0.5 to 7 mol (for example, from 0.7 to 6 mol, and preferably from 1 to 5 mol), but is ordinarily an excess number of moles and can be selected from an approximate range of, for example, from 1.1 to 5.5 mol, and may be from 1.5 to 5 mol (for example, from 1.75 to 4.5 mol), preferably from 2 to 4 mol (for example, from 2.25 to 3.75 mol), and even more preferably from 2.5 to 3.5 mol (for example, from 2.75 to 3.4 mol). If the proportion of the blocked polyisocyanate is too low, the adherence to the base material such as metal, the heat resistance, and the hot water resistance may decrease, and if the proportion of the blocked polyisocyanate is too large, the free polyisocyanate will remain, and the properties of the adhesive layer may be reduced. Furthermore, when an excessive amount of the blocked polyisocyanate is used, the adhesive layer functions as an active primer layer (active intermediate layer) even when the adhesive layer is cured, and thus reactivity with a molding resin (for example, a thermoplastic resin having a reactive group such as a hydroxyl group or an amino group, such as, for example, a polyester resin or polyamide-based resin) in the molded composite member can also be improved, and adherence with the molding resin can also be enhanced.

Specifically, the proportion of the concentration $C_{NCO}$ (mmol/kg) of isocyanate groups (NCO) of the blocked polyisocyanate to the concentration $C_{NH2}$ (mmol/kg) of the amino groups of the polyamide-based resin is not particularly limited, and the concentration of the amino groups may be excessive, but normally the concentration of the isocyanate groups is often high, and for example, the concentration (mmol/kg) of the isocyanate groups (NCO) relative to the concentration (mmol/kg) of the amino groups ($NH_2$) is often an excessive amount. A difference ($\Delta(C_{NCO}-C_{NH2})$) between the isocyanate group concentration ($C_{NCO}$) and the amino group concentration ($C_{NH2}$) may be approximately, for example, from 15 to 450 mmol/kg (for example, from 20 to 400 mmol/kg), preferably from 30 to 300 mmol/kg (for example, from 35 to 250 mmol/kg), and more preferably from 40 to 200 mmol/kg (for example, from 45 to 185 mmol/kg), or may be 20 mmol/kg or greater, preferably 30 mmol/kg or greater, and more preferably 40 mmol/kg or greater. Relative to the total number of moles of the amino groups of the polyamide-based resin, the total number of moles of isocyanate groups of the blocked polyisocyanate is approximately, for example, from 1.3 to 50 times (for example, from 1.5 to 40 times), preferably from 2 to 35 times (for example, from 2.5 to 25 times), and more preferably from 2.7 to 15 times (for example, from 3 to 10 times), or may be approximately from 2.7 to 10 times (for example, from 3 to 8.5 times).

Relative to 100 parts by mass of the polyamide-based resin, the proportion of the blocked polyisocyanate may be approximately from 2.5 to 35 parts by mass, preferably from 5 to 30 parts by mass (for example, from 7.5 to 25 parts by mass), and more preferably from 10 to 20 parts by mass (for example, from 10 to 15 parts by mass).

The proportion of epoxy groups of the epoxy compound is approximately, for example, from 0.1 to 1 mol (for example, from 0.2 to 0.9 mol), preferably from 0.2 to 0.8 mol (for example, from 0.25 to 0.7 mol), and more preferably from 0.3 to 0.6 mol (for example, from 0.35 to 0.55 moles), or may be approximately from 0.35 to 0.6 mol (for example, from 0.4 to 0.5 mol) per 1 mol of the amino group concentration of the polyamide-based resin. Note that the ratio (mmol/kg) of the carboxyl groups of the polyamide-based resin to the epoxy groups of the epoxy compound, (carboxyl groups)/(epoxy groups), may be approximately, for example, from 0.01/1 to 0.5/1 (for example, from 0.02/1 to 0.4/1), preferably from 0.03/1 to 0.3/1 (for example, from 0.04/1 to 0.2/1), and more preferably from 0.05/1 to 0.2/1 (for example, from 0.06/1 to 0.15/1).

The ratio (mmol/kg) of isocyanate groups of the blocked polyisocyanate to the hydroxyl groups (secondary hydroxyl groups) of the epoxy compound, (isocyanate groups)/(hydroxyl groups), may be approximately, for example, from 0.5/1 to 1.5/1 (for example, from 0.7/1 to 1.3/1), and preferably from 0.8/1 to 1.2/1 (for example, from 0.9/1 to 1.1/1).

Note that the mass ratio of the blocked polyisocyanate to the epoxy compound, (blocked polyisocyanate)/(epoxy compound), may be approximately from 20/80 to 80/20, preferably from 30/70 to 70/30, and more preferably from 40/60 to 60/40.

Relative to the total amount (total number of moles) (mmol/kg) of amino groups, isocyanate groups and epoxy groups, the concentration $C_{EP}$ of epoxy groups may be approximately, for example, from 2 to 40 mol % (for example, from 3 to 35 mol %), but is usually from 5 to 30 mol % (for example, from 5 to 25 mol %), preferably from 7 to 25 mol % (for example, from 8 to 20 mol %), and more preferably from 10 to 20 mol % (for example, from 10 to 18 mol %), and may be at least 6 mol %, and more preferably at least 8 mol %. In particular, when the concentration $C_{NCO}$ of the isocyanate groups relative to the concentration $C_{NH2}$ of the amino groups is excessive as described above, and the concentration $C_{EP}$ of the epoxy groups is at a proportion described above, in addition to the initial adherence strength being high, a decrease in adhesive strength even when immersed in hot water can be suppressed.

Relative to 100 parts by mass of the polyamide-based resin, the proportion of the epoxy compound may be approximately, for example, from 2.5 to 35 parts by mass, preferably from 5 to 30 parts by mass (for example, from 7.5 to 25 parts by mass), and even more preferably from 10 to 20 parts by mass (for example, from 10 to 15 parts by mass), or may be approximately from 10 to 22 parts by mass. If the proportion of the epoxy compound is too small, the adherence to the base material such as metal tends to decrease, and if the proportion of the epoxy compound is too high, the epoxy compound will remain, and the properties of the adhesive layer may be reduced. Note that when an excessive amount of the epoxy compound is used, the adhesive layer functions as an active primer layer (active intermediate layer) even when the adhesive layer is cured, and therefore reactivity with a molding resin (for example, a thermoplastic resin having a reactive group such as a carboxyl group or an amino group, such as, for example, a polyester resin or polyamide-based resin) in the molded composite member can also be improved, and adherence with the molding resin can also be enhanced.

[Form of the Curable Resin Composition]

The curable resin composition according to an embodiment of the present invention may be a liquid composition containing a solvent (solution composition or dispersion), or may have a powdered or granular form. The curable resin composition may normally be a mixture (powder mixture) of the polyamide-based resin in a powder form, a blocked polyisocyanate in a powder form, and an epoxy compound in a powder form, or may be in the form of a powder or granules of a composition (integrally solidified composition) obtained by mixing the components (the polyamide-based resin, the blocked polyisocyanate, and the epoxy compound).

The average particle size $D_{50}$ of each component (polyamide-based resin, blocked polyisocyanate, and epoxy compound) in the form of a powder or granules can be selected, for example, from an approximate range from 1 to 300 μm provided that the uniformity of the coating film is not impaired, and ordinarily, the average particle size may be approximately from 2 to 200 μm (for example, from 5 to 150 μm), preferably from 10 to 100 μm (for example, from 15 to 80 μm), and more preferably from 20 to 70 μm. The average particle size $D_{50}$ can be measured using a commonly used method, for example, a particle size distribution measurement device using a laser diffraction/scattering method.

The curable resin composition according to an embodiment of the present invention may be in a solution form, but when the curable resin composition is in a solid form (in the form of a powder or granules), the reaction of each component can be suppressed, resulting in good storage stability even when the amino group of the polyamide-based resin, the isocyanate group of the blocked polyisocyanate, and the epoxy group of the epoxy compound are reactive with each other. Also, as described above, the curable resin composition exhibits high adhesiveness or adherence to a base material (a base material such as a metal). Therefore, the curable resin composition according to an embodiment of the present invention is effective for covering or coating a base material (or member), protecting the base material with a coating film, and improving corrosion resistance and durability.

[Composite Member and Method for Producing the Same]

The composite member can be produced by coating the surface of a base material (or member) with the curable resin composition (adhesive resin composition) to form an adhesive layer (cured film or primer layer).

The type of the base material is not particularly limited, and examples thereof include metals (for example, iron or iron alloys (such as stainless steel), aluminum or aluminum alloys, copper, and zinc), ceramics (for example, pottery, porcelain, oxide-based ceramics, nitride-based ceramics, and boride-based ceramics), plastics (such as molded bodies of: thermosetting or photocurable resins such as epoxy-based resins, phenol-based resins, and polyimide-based resins; and heat-resistant thermoplastic resins (such as engineering plastics) such as polyalkylene arylate-based resins, polyarylate-based resins, aromatic polyamide-based resins, polycarbonate-based resins, polyurethane-based resins, thermoplastic polyimide-based resins, polyphenylene ether-based resins, polyether ketone-based resins, polyether ether ketone-based resins, polyphenylene sulfide-based resins, polysulfone resins, polyether sulfone-based resins, and liquid crystal plastics (such as molded bodies of engineering plastics, etc.), and wood, and the like. The base material may be a composite base material (for example, a base material provided with a vapor deposited film or the like, a laminate base material such as a laminate body of the metal and a heat-resistant thermoplastic resin, or the like).

Preferable base materials are metals, such as for example, iron (such as steel plates), aluminum or alloys thereof (such as stainless steel). Depending on the type of base material, these base materials may be subjected to a surface treatment, and for example, if the base material is a metal base material, the base material may be subjected to a treatment such as degreasing, polishing, electrolysis, or surface roughening.

Commonly used application or coating methods can be used for coating the base material with the curable resin composition, and with regard to a powder curable resin composition, a powder coating method such as, for example, flow immersion (a method of immersing a base material such as a heated metal into a flowing phase of granules to form a coating film), electrostatic powder coating, or electrodeposition coating (cationic electrodeposition coating, and the like) can be used. Note that with a thermal spraying method or the like in which coating is performed through a melting step, there is a possibility that the reactive groups of each component may react in association with the melting and heating before the coating film is formed. The electrostatic powder coating method may be a powder electrostatic spray method, an electrostatic flow immersion method (a method in which a powder is attracted and adhered by static electricity to form a coating film in a flow immersion method), or the like. In order to form a uniform coating film (adhesive layer) on the surface of the base material, an electrostatic powder coating method, which involves minimal thermal history and is capable of suppressing the consumption of the reactive groups of each component, may be adopted.

In order to proceed a reaction between the polyamide-based resin, the blocked polyisocyanate, and the epoxy compound, the coating film can typically be formed by heating (or baking), and a cured film may be formed. The heating temperature (or baking temperature) may be, for example, approximately from 170 to 270° C., preferably from 180 to 250° C., and more preferably from 190 to 220° C. The heating time (or baking time) may be, for example, approximately from 1 to 10 minutes, preferably from 2 to 8 minutes, and even more preferably from 3 to 6 minutes.

The thickness of the coating film (adhesive layer or cured film) formed in this manner may be approximately from 1 to 500 μm, for example, and may typically be approximately from 5 to 250 μm, preferably from 10 to 200 μm, and even more preferably from 25 to 175 μm (for example, from 50 to 150 μm).

Such an adhesive layer not only exhibits high adherence to the base material or member, but also has high heat resistance, hot water resistance, and the like. Therefore, even when a thermoplastic resin is molded, voids do not form at the interface between the base material and the adhesive layer (or cured film) regardless of the molding conditions, and thus such an adhesive layer is useful for forming a uniform molded part with high adherence and durability.

[Molded Composite Member and Method for Producing the Same]

The molded composite member can be produced by molding or laminating a composition containing at least a thermoplastic resin onto an adhesive layer of the composite member (a composite member provided with a base material such as the metal base material described above, and the adhesive layer described above formed on the surface of the base material).

The type of thermoplastic resin is not particularly limited, and examples thereof include olefin-based resins (such as polyethylene-based resins, polypropylene-based resins, modified or copolymerized olefin-based resins, and cyclic olefin-based resins), styrene-based resins (such as acrylonitrile-styrene-based resins (AS resins) and other such styrene-based copolymers, impact-resistant polystyrene-based resins, acrylonitrile-styrene-butadiene-based resins (ABS resins) and other such rubber-reinforced styrene-based resins), (meth)acrylic-based resins, vinyl acetate-based resins (or derivatives thereof, such as, for example, polyvinyl alcohol-based resins, and polyvinyl acetal resins), vinyl chloride-based resins, polyester-based resins (such as polyethylene terephthalate-based resins, polybutylene terephthalate-based resins, polyethylene naphthalate-based resins, and other such polyalkylene arylate-based resins, and polyarylate-based resins), polyamide-based resins, polycarbonate-based resins, polyurethane-based resins, thermoplastic polyimide-based resins, polyacetal-based resins, polyether-based resins (such as polyphenylene ether-based resins, polyether ketone-based resins, and polyether ether ketone-based resins), polyphenylene sulfide-based resins, polysulfone-based resins (such as polysulfone resins and polyethersulfone-based resins), liquid crystal plastics (such as liquid crystal aromatic polyester-based resins), and thermoplastic elastomers (such as olefin-based elastomers, styrene-based elastomers, polyester-based elastomers, polyamide-based elastomers, polyurethane-based elastomers, and fluorine-based elastomers). Furthermore, depending on the application, a rubber (or unvulcanized rubber composition) such as ethylene-propylene-diene rubber can also be used. These thermoplastic resins can be used alone or in a combination of two or more types.

The thermoplastic resin may have a functionality (reactive group) such as a hydroxyl group, a carboxyl group, an amino group, and a blocked isocyanate group. Note that the adhesive layer is active, and an improvement in adherence due to reaction with a molding resin or a laminated sheet can be anticipated. In particular, when a reactive group such as an amino group, an isocyanate group, and/or an epoxy group (in particular, at least an isocyanate group) remains in the adhesive layer, the adhesive layer is active even when cured, and therefore the reactive groups remaining in the adhesive layer and the functionality (reactive groups) of the thermoplastic resin may react and improve the adherence with the molding resin or laminated sheet.

In an embodiment of the present invention, a thermoplastic resin having a melting point or glass transition temperature that is lower than or equal to the melting point of the polyamide-based resin of the curable resin composition can also be molded. However, even when a thermoplastic resin having a melting point higher than that of the polyamide-based resin is molded, voids do not form at the interface between the base material such as metal and the adhesive layer, and a resin molded part or a laminated part can be formed with high adherence and durability. Therefore, in order to form a resin molded part or a laminated part with high heat resistance and durability, the thermoplastic resin may have a melting point or glass transition temperature greater than or equal to the melting point of the polyamide-based resin. Depending on the type of thermoplastic resin, the melting point or glass transition temperature of such a thermoplastic resin may be approximately, for example, from 100 to 350° C. (for example, from 160 to 330° C.), and preferably from 170 to 300° C. (for example, from 200 to 280° C.), and typically may be approximately from 180 to 270° C. (for example, from 190 to 260° C.), and preferably from 200 to 250° C. (for example, from 200 to 240° C.).

The preferred thermoplastic resin may be an aromatic polyester resin such as polyalkylene arylate-based resins and polyarylate-based resins, which may have a terminal hydroxyl group and/or a terminal carboxyl group, or a polyamide-based resin that may have an amino group and/or a carboxyl group, and in particular may be a polyamide-based resin having an amino group. The polyamide-based resin may be, for example, polyamide 46, polyamide 6, polyamide 66, a cycloaliphatic polyamide containing the alicyclic diamine component and/or alicyclic dicarboxylic acid component as a polymerizing component, polyamide MXD-6 (a polyamide resin containing at least xylylene diamine and adipic acid as reaction components), or an amorphous polyamide (such as a polyamide resin containing at least terephthalic acid and trimethylhexamethylene diamine as reaction components). Note that the amino group concentration and the carboxyl group concentration of the polyamide-based resin are the same as those described above.

As necessary, the thermoplastic resin may contain various additives such as, for example, stabilizers (heat resistant stabilizers, weather resistant stabilizers, antioxidants, and UV absorbers, etc.), colorants, magnetic materials (a paramagnetic material such as ferrite, or a ferromagnetic material such as a magnet), fillers, reinforcing agents, plasticizers, lubricants, flame retardants, antistatic agents, and silane coupling agents. These additives can be used alone or in a combination of two or more types. The reinforcing agent may be a granular reinforcing agent such as calcium carbonate, barium sulfate, titanium oxide, silica, alumina, mica, clay, talc, or carbon black; or may be a fibrous reinforcing agent such as rayon, nylon, vinylon, aramid, or other such organic fibers, or glass fibers, carbon fibers, metal fibers, whiskers, or other such inorganic fibers. A preferable reinforcing agent is a fibrous reinforcing agent such as glass fibers. The content of the reinforcing agent may be, for example, approximately from 5 to 50 parts by mass, and preferably from 10 to 40 parts by mass, per 100 parts by mass of the thermoplastic resin.

The composition containing the thermoplastic resin may be molded (overmolded or molded) to the adhesive layer, or may be laminated to the adhesive layer in the form of a sheet. Molding of the thermoplastic resin composition can be performed in accordance with commonly used insert molding, and a molded composite member in which a molded part of a thermoplastic resin composition is formed in a laminate form on the adhesive layer of the composite member can be produced by melting and molding the thermoplastic resin composition by injection molding or the like. For example, a thermoplastic resin composition, a thermoplastic resin composition containing the magnetic substance, a thermoplastic resin composition containing a reinforcing agent such as glass fibers, or the like may be melt-kneaded and injection molded onto the adhesive layer to prepare a composite molded body in which a resin layer, a magnetic layer, a reinforcing layer, or the like is formed on a base material such as a metal.

The thermoplastic resin composition may also be melt extruded and molded in a sheet-like form, and directly layered or laminated to the adhesive layer in the form of a molten sheet; or may be molded in the form of a sheet or tape of a thermoplastic resin composition containing a reinforcing agent such as glass fibers (for example, an oriented sheet or tape (uni-directional material) in which a fibrous reinforcing agent is oriented in a predetermined direction), and the molded sheet or tape may be laminated (heated and laminated) directly to the adhesive layer. Note that by laminating an oriented sheet, tape, or the like, even if the thickness of the base material such as a metal is small, a composite molded body having excellent mechanical properties can be produced.

EXAMPLES

Hereinafter, the present invention is described in greater detail based on examples, but the present invention is not limited to these examples.

The following materials were used in the examples and comparative examples below.

[Base Material]
A steel plate (stainless steel plate SUS430 available from Nippon Testpanel Co., Ltd.) was degreased and used.

[Polyamide-Based Resin]
PA1: Polyamide 12 (available from Daicel-Evonik Ltd., water absorption of 0.25%, amino group concentration of 145 mmol/kg, carboxyl group concentration of 4 mmol/kg, powder: average particle size of 47 μm)

PA2: Copolyamide 6/6/12 (available from Daicel-Evonik Ltd., water absorption of 1.5%, amino group concentration of 187 mmol/kg, carboxyl group concentration of 1.5 mmol/kg, powder: average particle size of 42 μm)

Note that the water absorption was measured through a water absorption test specified by ASTM D570. The amino group concentration and the carboxyl group concentration were measured through a neutralization titration method. Furthermore, the polyamide resin was frozen and pulverized and the average particle size was measured by a particle size distribution measurement device based on a laser diffraction/scattering method.

[Blocked Isocyanate]
B-I: Blocked isocyanate ("VESTAGON BF1540" uretdione polyisocyanate adduct, available from Evonik Corporation, isocyanate group concentration of 3600 mmol/kg, glass transition temperature of 84° C. or lower, powder)

Note that the concentration of isocyanate groups was calculated from the isocyanate content.

[Epoxy Compound]
EP1: Bisphenol A-type epoxy resin (available from Mitsubishi Chemical Corporation, epoxy group concentration of 500 mmol/kg, hydroxyl group concentration of 3600 mmol/kg, powder)

EP2: Bisphenol A-type epoxy resin ("Araldite GT 7004" available from Ciba-Geigy AG, epoxy group concentration of 1500 mmol/kg, powder)

The epoxy group concentration was calculated from the epoxy equivalent, and the hydroxyl group concentration was calculated based on the number of repeating units obtained from the molecular weight of the epoxy resin.

[Molding Resin]
PA3: "Amilan CM1017" available from Toray Industries, Inc., water absorption of 1.8% in accordance with ASTM D570, amino group concentration of 37 mmol/kg)

Examples and Comparative Examples

A polyamide resin powder, a blocked polyisocyanate powder, and an epoxy resin powder were mixed at the proportions shown in Table 1 to prepare a powdered mixture, the powdered mixture was electrostatically coated at a thickness of approximately 100 μm onto a degreased base material, which was then heated for 5 minutes at 185° C. in an oven to form a coating film, and a composite member was prepared.

A molding resin PA3 was injection molded (insert molded) onto the coating film of the composite member at a cylinder temperature of 280° C. using an injection molding machine ("ET40V" available from Toyo Machinery & Metal Co., Ltd.) to form a resin layer with a thickness of 3 mm, and thereby a composite molded body was prepared.

[Adhesive Strength]
The adhesive strength of the resin layer with respect to the base material of the produced composite molded body was measured according to ISO 19095-2 Type B.

[Hot Water Immersion Test]
The produced composite molded body was immersed for 50 hours in hot water at 80° C., and then the adhesive strength was measured in the same manner as described above.

The results are shown in Table 1. Note that in Table 1, "PA Water Absorption" indicates the water absorption of the polyamide-based resin or the polyamide-based resin mixture, "NH$_2$ (PA)" indicates the molar ratio of the amino groups in the polyamide-based resin or the polyamide-based resin mixture, "NCO (B-I) indicates the molar ratio of the isocyanate groups of the blocked polyisocyanate (B-1), "Epoxy (EP)" indicates the molar ratio of the epoxy groups of the epoxy compound, and "$\Delta(C_{NCO}-C_{NH2})$" indicates the difference (units: mmol/kg) between the isocyanate group concentration $C_{NCO}$ of the blocked polyisocyanate (B-1) and the concentration $C_{NH2}$ of the amino groups of the polyamide-based resin (PA).

TABLE 1

| | PA Mass Ratio | | | | | Water Absorption (%) | Molar Ratio | | | Δ($C_{NCO}$ − $C_{NH2}$) | Adhesive Strength MPa | |
|---|---|---|---|---|---|---|---|---|---|---|---|---|
| | PA1 | PA2 | B-I | EP1 | EP2 | | $NH_2$ (PA) | NCO (B-I) | Epoxy (EP) | | Initial | After immersion in hot water |
| Example 1 | 80 | — | 15 | 5 | — | 0.25 | 17 | 79 | 4 | 62 | 13 | 11 |
| Example 2 | 80 | — | 5 | 15 | — | 0.25 | 31 | 48 | 21 | 17 | 18 | 15 |
| Example 3 | 80 | — | 10 | 10 | — | 0.25 | 22 | 68 | 10 | 46 | 25 | 24 |
| Example 4 | 70 | — | 20 | 10 | — | 0.25 | 12 | 83 | 6 | 71 | 15 | 13 |
| Example 5 | 70 | — | 15 | 15 | — | 0.25 | 14 | 75 | 11 | 61 | 22 | 20 |
| Example 6 | 70 | — | 10 | 20 | — | 0.25 | 18 | 64 | 18 | 46 | 23 | 21 |
| Example 7 | 60 | 20 | 10 | 10 | — | 0.56 | 25 | 205 | 10 | 180 | 15 | 12 |
| Comparative Example 1 | — | 80 | 10 | 10 | — | 1.5 | 29 | 179 | 9 | 150 | 15 | 4 |
| Example 8 | 56 | 24 | 10 | 10 | — | 0.63 | 25 | 203 | 9 | 178 | 15 | 8 |
| Example 9 | 49 | 21 | 20 | 10 | — | 0.63 | 13 | 446 | 6 | 433 | 18 | 16 |
| Comparative Example 2 | 28 | 49 | 15 | 15 | — | 1.04 | 19 | 259 | 10 | 240 | 17 | 8 |
| Example 10 | 64 | 16 | 10 | 10 | — | 0.5 | 25 | 207 | 10 | 182 | 24 | 23 |
| Comparative Example 3 | — | 95 | 5 | — | 5 | 1.5 | 168 | 180 | 75 | 22 | 15 | 2 |

As is clear from Table 1, compared to the resin compositions of the Comparative Examples, resin compositions with low water absorption were used in the Examples, and therefore the resin compositions of the Examples exhibited adherence with high durability even with respect to hot water. In particular, the results indicate that when the adhesive layer is formed from a resin composition having a predetermined epoxy group concentration and having a concentration of isocyanate groups of the blocked polyisocyanate exceeding the amino group concentration of the polyamide-based resin by a predetermined amount, the molding resin layer can be formed with a high level of adherence. Note that Comparative Example 3 corresponds to an example presented in Patent Document 1.

INDUSTRIAL APPLICABILITY

The present invention is suitable for producing a composite molded body (hybrid member) in which a resin and a base material such as a metal are combined (hybridized), and the composite molded body can be used in applications requiring a high level of durability, such as, for example, vehicles (such as automobiles), trains, airplanes or aircraft, ships, and other such vehicles, or structural members or chassis system members (suspension, wheels, brake device, etc.) of vehicles (transportation equipment or transportation means), and components or members (such as structural members) of rail structures or the like. Specifically, the molded composite member can be applied to a vehicle structural member (such as an automobile component or member) such as, for example, a front end (bumper).

The invention claimed is:

1. A curable resin composition comprising:
   a polyamide-based resin;
   a blocked polyisocyanate; and
   an epoxy compound,
   wherein the molar ratio of the amino groups to the carboxy groups of the polyamide-based resin is from 60/40 to 99.9/0.1,
   the polyamide-based resin includes an amino group concentration from 20 to 300 mmol/kg and has a water absorption of 1 mass % or less determined by a water absorption test specified by ASTM D570, in which a dried sample formed of the polyamide-based resin with a thickness of 0.125 is cooled in a desiccator, then a mass of the sample is measured, the sample is immersed in water of 23° C. for 24 hours, and then removed from the water, excess moisture is wiped off, and then the mass of the sample is measured, a ratio of the mass of the sample after wiping off the excess moisture to the mass of the dried sample being defined as the water absorption,
   the quantitative proportion of the polyamide-based resin relative to the total amount of 100 mass % of the polyamide-based resin, the blocked polyisocyanate, and the epoxy compound is from 50 to 95 mass %,
   the total number of moles of isocyanate groups of the blocked polyisocyanate is from 1.3 to 50 times relative to the total number of moles of the amino groups of the polyamide-based resin,
   the molar ratio of the carboxy groups of the polyamide-based resin to the epoxy groups of the epoxy compound is from 0.01/1 to 0.5/1 in terms of the former/latter, and
   the proportion of epoxy groups of the epoxy compound is from 0.1 to 1 mol relative to 1 mol of the amino group concentration of the polyamide-based resin.

2. The curable resin composition according to claim 1, wherein the polyamide-based resin includes a C8-18 alkylene chain, and has an amino group concentration from 25 to 275 mmol/kg and a melting point from 160 to 250° C.

3. The curable resin composition according to claim 1, wherein the polyamide-based resin has a proportion of a component having a C8-16 alkylene chain from 65 to 100 mol % relative to a total amount of components forming the polyamide-based resin, and has a water absorption of 0.75 mass % or less determined by the water absorption test specified by ASTM D570.

4. The curable resin composition according to claim 1, wherein the polyamide-based resin has a proportion of a component having a C10-14 alkylene chain from 70 to 100 mol % relative to a total amount of components forming the polyamide-based resin, and has an amino group concentration from 50 to 250 mmol/kg and a melting point from 170 to 220° C.

5. The curable resin composition according to claim 1, wherein the polyamide-based resin is a homo- or copolyamide resin that includes a component having at least one type of C11-13 alkylene chain selected from the group consisting of C11-13 lactams and C11-13 aminocarboxylic acids, at a proportion from 75 to 100 mol % relative to a total amount of components forming the polyamide-based resin, and has a water absorption of 0.65 mass % or less determined by the water absorption test specified by ASTM D570.

6. The curable resin composition according to claim 1, wherein the polyamide-based resin has a water absorption of 0.3 mass % or less determined by the water absorption test specified by ASTM D570.

7. The curable resin composition according to claim 1, wherein the blocked polyisocyanate has a glass transition temperature from 60 to 110° C., a melting point from 70 to 130° C., and a dissociation temperature from 120 to 200° C.; and the epoxy compound includes a bisphenol-type epoxy resin having a softening temperature of 75° C. or higher.

8. The curable resin composition according to claim 1, wherein, per 1 mol of amino groups of the polyamide-based resin, a proportion of isocyanate groups of the blocked polyisocyanate is from 1.5 to 5 mol, and a proportion of epoxy groups of the epoxy compound is from 0.1 to 0.8 mol.

9. The curable resin composition according to claim 1, wherein isocyanate groups of the blocked polyisocyanate are present at an excess from 15 to 450 mmol/kg relative to amino groups of the polyamide-based resin, and a concentration of epoxy groups is from 3 to 35 mol % relative to a total number of moles of amino groups, isocyanate groups, and epoxy groups.

10. The curable resin composition according to claim 1, wherein a total number of moles of isocyanate groups of the blocked polyisocyanate is from 1.5 to 40 times a total number of moles of amino groups of the polyamide-based resin, and the curable resin composition includes the blocked polyisocyanate at a proportion from 5 to 30 parts by mass, and the epoxy compound at a proportion from 5 to 30 parts by mass per 100 parts by mass of the polyamide-based resin.

11. A composite member in which an adhesive layer of the curable resin composition described in claim 1 is formed on a surface of a base material.

12. A molded composite member formed by molding or laminating a composition containing at least a thermoplastic resin onto the adhesive layer of the composite member described in claim 11.

13. The molded composite member according to claim 12, wherein the base material is a metal base material, and the thermoplastic resin includes a polyamide-based resin having a higher melting point than that of the polyamide-based resin of the curable resin composition.

14. A method of producing a composite member, the method comprising forming an adhesive layer by coating a surface of a base material with the curable resin composition described in claim 1.

15. A method for producing a molded composite member by molding or laminating a composition including at least a thermoplastic resin onto the adhesive layer of the composite member described in claim 11.

* * * * *